United States Patent
Aliyev

(10) Patent No.: US 9,181,835 B2
(45) Date of Patent: Nov. 10, 2015

(54) SUPERVISORY MODEL PREDICTIVE SELECTIVE CATALYTIC REDUCTION CONTROL METHOD

(71) Applicant: Caterpillar Inc., Peoria, IL (US)

(72) Inventor: Timur Aliyev, Chicago, IL (US)

(73) Assignee: Caterpillar Inc., Peoria, IL (US)

(*) Notice: Subject to any disclaimer, the term of this patent is extended or adjusted under 35 U.S.C. 154(b) by 119 days.

(21) Appl. No.: 13/965,401

(22) Filed: Aug. 13, 2013

(65) Prior Publication Data

US 2015/0047318 A1    Feb. 19, 2015

(51) Int. Cl.
*F01N 3/00* (2006.01)
*F01N 3/20* (2006.01)
*F02D 41/02* (2006.01)
*F02D 41/14* (2006.01)
*F01N 3/021* (2006.01)

(52) U.S. Cl.
CPC ............ *F01N 3/208* (2013.01); *F02D 41/0275* (2013.01); *F02D 41/1463* (2013.01); *F01N 3/021* (2013.01); *F01N 2560/021* (2013.01); *F01N 2560/026* (2013.01); *F01N 2610/02* (2013.01); *F01N 2900/08* (2013.01); *F01N 2900/1402* (2013.01); *F01N 2900/1404* (2013.01); *F01N 2900/1411* (2013.01); *F01N 2900/1621* (2013.01); *F01N 2900/1622* (2013.01); *F02D 2250/36* (2013.01)

(58) Field of Classification Search
USPC .................................................. 60/272–324
See application file for complete search history.

(56) References Cited

U.S. PATENT DOCUMENTS

| | | | |
|---|---|---|---|
| 6,125,629 A | 10/2000 | Patchett | |
| 7,093,427 B2 | 8/2006 | Van Nieuwstadt et al. | |
| 7,178,328 B2 | 2/2007 | Sobrig | |
| 8,225,595 B2 | 7/2012 | Garimella et al. | |
| 2005/0282285 A1 | 12/2005 | Radhamohan et al. | |
| 2009/0026076 A1 | 1/2009 | Yang | |
| 2009/0218220 A1 | 9/2009 | Matter et al. | |
| 2009/0293457 A1 | 12/2009 | Grichnik et al. | |
| 2010/0003178 A1 | 1/2010 | Tokunaga et al. | |
| 2010/0032292 A1 | 2/2010 | Wang et al. | |
| 2010/0050614 A1* | 3/2010 | Parmentier et al. | 60/287 |
| 2010/0107609 A1 | 5/2010 | Parmentier et al. | |
| 2010/0223908 A1* | 9/2010 | Solbrig et al. | 60/276 |
| 2010/0242440 A1 | 9/2010 | Garimella et al. | |

(Continued)

FOREIGN PATENT DOCUMENTS

JP    2008/303759 A    12/2008
JP    2009/210298 A    9/2009

(Continued)

*Primary Examiner* — Jesse Bogue
(74) *Attorney, Agent, or Firm* — Miller, Matthias & Hull LLP

(57) ABSTRACT

A method of controlling an aftertreatment system having a SCR catalyst and communicating with an engine electronic control module (ECM) is provided. The method may receive a plurality of system values corresponding to $NH_3$ and $NO_x$ emissions of the aftertreatment system; determine an optimal urea dosing target value based on the system values and one of a target $NH_3$ storage value and an estimated $NH_3$ storage value; and determine an optimal engine $NO_x$ output target value based on the system values and a measured $NO_x$ conversion efficiency value.

20 Claims, 3 Drawing Sheets

(56) References Cited

U.S. PATENT DOCUMENTS

| | | |
|---|---|---|
| 2010/0281855 A1 | 11/2010 | Sun et al. |
| 2010/0301871 A1 | 12/2010 | Biskupski |
| 2011/0162350 A1* | 7/2011 | Ponnathpur .................... 60/274 |
| 2011/0185707 A1 | 8/2011 | Upadhyay et al. |
| 2011/0265452 A1 | 11/2011 | Geveci et al. |
| 2012/0036842 A1* | 2/2012 | Nakamura .................... 60/287 |
| 2012/0055789 A1 | 3/2012 | Swartz et al. |
| 2012/0096837 A1 | 4/2012 | Yacoub |
| 2012/0145543 A1 | 6/2012 | Sugaya et al. |
| 2012/0173022 A1 | 7/2012 | Cho |
| 2012/0228138 A1 | 9/2012 | West et al. |
| 2012/0233986 A1 | 9/2012 | Geveci et al. |
| 2012/0255286 A1 | 10/2012 | Matsunaga et al. |
| 2014/0123629 A1* | 5/2014 | Singh et al. .................... 60/274 |

FOREIGN PATENT DOCUMENTS

| | | |
|---|---|---|
| JP | 2012/037509 A | 2/2012 |
| JP | 2013072391 A | 4/2013 |
| KR | 811932 B1 | 1/2007 |
| KR | 999622 B1 | 7/2008 |
| KR | 992812 B1 | 10/2008 |
| WO | WO 2009/098798 A1 | 8/2009 |
| WO | WO 2011/091912 A1 | 8/2011 |
| WO | WO 2011/118095 A1 | 9/2011 |
| WO | WO 2012/072566 A1 | 6/2012 |

* cited by examiner

SUPERVISORY MODEL PREDICTIVE SELECTIVE CATALYTIC REDUCTION CONTROL METHOD

TECHNICAL FIELD

The present disclosure generally relates to exhaust aftertreatment systems, and more particularly, to systems and methods of controlling aftertreatment systems to optimize the conversion efficiency of nitrogen oxides as well as engine fuel efficiency.

BACKGROUND

Internal combustion engines, including diesel engines, gasoline engines, gaseous fuel-powered engines, and other engines known in the art exhaust a complex mixture of air pollutants. These air pollutants are generally composed of particulates and gaseous compounds including nitrogen oxides ($NO_x$) among others. Due to increased awareness of the environment, exhaust emission standards have become more stringent, and the amounts of particulates and $NO_x$ emitted into the atmosphere by an engine may be regulated depending on the type of the engine, size of the engine, class of the engine, and the like.

In order to comply with the regulation of particulates and $NO_x$, some engine manufacturers have implemented a strategy called selective catalytic reduction (SCR), which is a process where a reagent, most commonly urea (($NH_2$)$_2$CO), or a water/urea solution, is selectively injected into the exhaust gas stream of an engine and absorbed onto a downstream substrate. The injected urea solution decomposes into ammonia ($NH_3$), which reacts with $NO_x$ in the exhaust gas to form water ($H_2O$) and diatomic nitrogen ($N_2$). However, because an excess in either the $NO_x$ or the urea injected may result in undesirable emissions, the urea dosage must be carefully controlled.

Aftertreatment models have been developed to help SCR systems estimate the appropriate amount of urea to be injected for different conditions to result in better $NO_x$ conversion efficiencies. One such type of model is a model predictive control (MPC) which generally assumes a certain $NO_x$ quantity for a given model of the exhaust system and guides the SCR process based on this quantity. While aftertreatment models may provide some means for estimating appropriate urea dosing values and improving the overall $NO_x$ conversion efficiency, there is still room for improvement.

In particular, the quantity of $NO_x$ that is exhausted from an engine, or the engine $NO_x$ output value, is not only tied to reducing pollutants, but it is also directly tied to the fuel efficiency of the associated engine. For instance, an increase in fuel efficiency results in an increase in engine $NO_x$ output, and a decrease in fuel efficiency results in a decrease in engine $NO_x$ output. Conventional MPC models may estimate optimal urea dosing values, but there are still no models which also estimate optimal engine $NO_x$ output for the purposes of improving fuel efficiency.

The present disclosure is directed at addressing one or more of the deficiencies set forth above.

SUMMARY OF THE DISCLOSURE

In one aspect of the present disclosure, a method of controlling an aftertreatment system having a selective catalytic reduction (SCR) catalyst and communicating with an engine electronic control module (ECM) is provided. The method may include receiving a plurality of system values corresponding to $NH_3$ and $NO_x$ emissions of the aftertreatment system; determining an optimal urea dosing target value based on the system values and one of a target $NH_3$ storage value and an estimated $NH_3$ storage value; and determining an optimal engine $NO_x$ output target value based on the system values and a measured $NO_x$ conversion efficiency value.

In another aspect of the disclosure, a method of controlling an aftertreatment system having a SCR catalyst and communicating with an engine ECM is provided. The method may include receiving a plurality of system values associated with the aftertreatment system including at least a measured $NH_3$ value, a measured $NO_x$ value, an actual engine $NO_x$ output value, a previous urea dosing target value, and a previous engine $NO_x$ output target value; determining a predicted $NH_3$ storage value based on the system values; determining an optimal urea dosing target value based on a differential between the predicted $NH_3$ storage value and one of a target $NH_3$ storage value and an estimated $NH_3$ storage value; determining a predicted $NO_x$ conversion efficiency value based on the system values; and determining an optimal engine $NO_x$ output target value based on a differential between the predicted $NO_x$ conversion efficiency value and a measured $NO_x$ conversion efficiency value.

In yet another aspect of the disclosure, an aftertreatment system for an engine having an associated engine ECM is provided. The aftertreatment system may include a SCR catalyst disposed downstream of the engine, at least one $NH_3$ sensor and at least one $NO_x$ sensor disposed downstream of the SCR catalyst, and a control unit in electrical communication with each of at least the $NH_3$ sensor, the $NO_x$ sensor, and the engine ECM. The control unit may be configured to receive a plurality of system values corresponding to $NH_3$ and $NO_x$ emissions of the aftertreatment system, determine an optimal urea dosing target value based on the system values and one of a target $NH_3$ storage value and an estimated $NH_3$ storage value, and determine an optimal engine $NO_x$ output target value based on the system values and a measured $NO_x$ conversion efficiency value.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
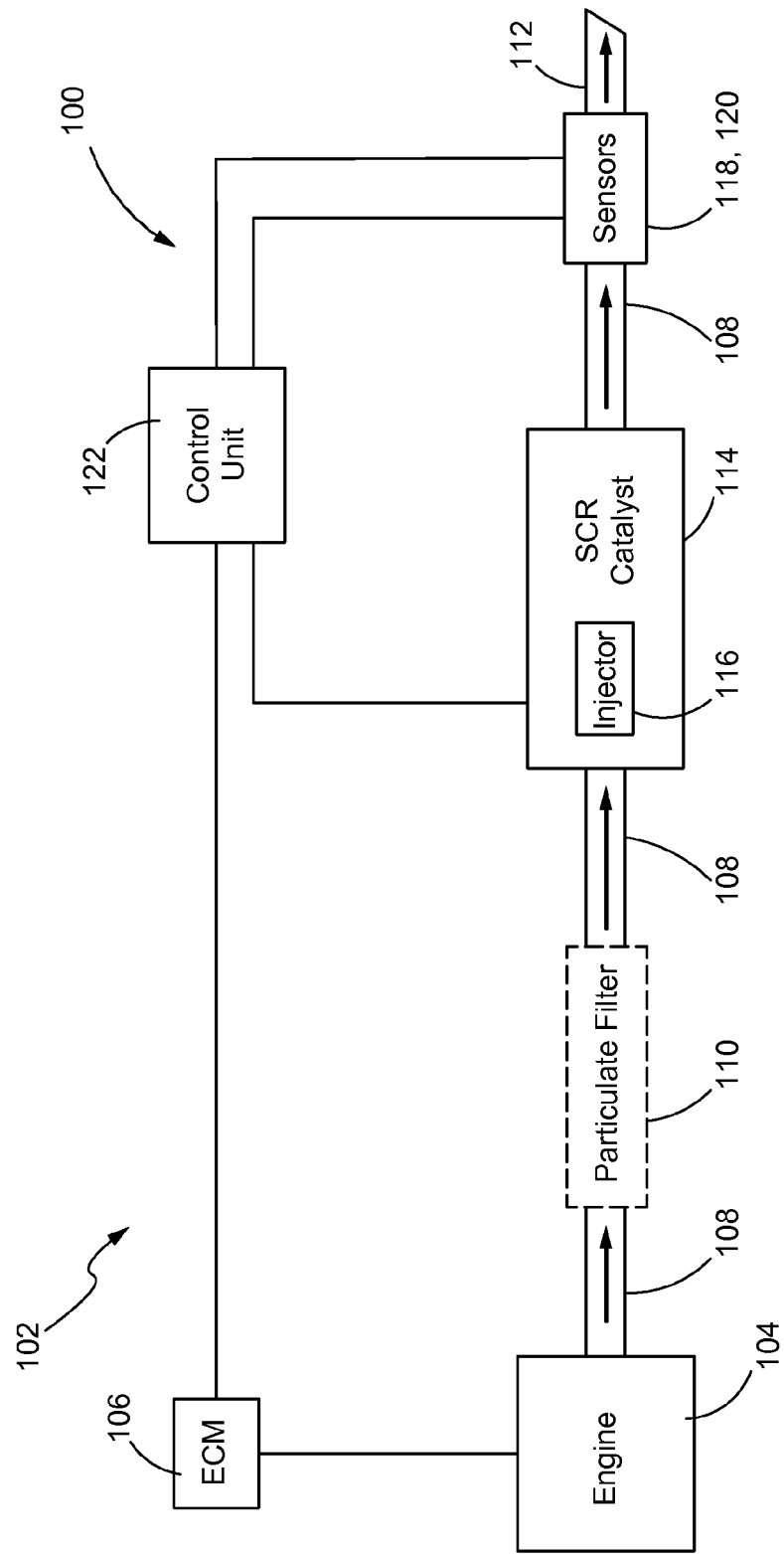
FIG. 1 is a diagrammatic view of an exhaust system provided with an aftertreatment system constructed in accordance with the teachings of the present disclosure.

As shown in FIG. 1, one exemplary embodiment of an aftertreatment system 100 is provided. The aftertreatment system 100 may be employed in conjunction with industrial work machines, stationary drive machines, mobile work vehicles, hybrid electric vehicles, machine tools, or the like. More particularly, the aftertreatment system 100 may be integrated into an exhaust system 102 that is associated with an engine 104 and at least partially managed by an engine electronic control module (ECM) 106 associated with the engine 104. The engine 104 may include a diesel engine, a gasoline engine, or any other internal combustion engine which generates mechanical energy by igniting a fuel, such as diesel fuel, gasoline or petroleum gas, or the like. The engine ECM 106 may be implemented using any one or more of a processor, a microprocessor, a controller, a microcontroller, a digital signal processor (DSP), a field-programmable gate array (FPGA), an electronic control unit (ECU), or any other suitable means for electronically monitoring, operating and/or managing certain functions of the engine 104 according to preprogrammed algorithms stored within a memory thereof or otherwise accessible thereto.

Still referring to FIG. 1, the exhaust system 102 may generally include an exhaust line or downpipe 108 configured to route exhaust gases exiting the engine 104 toward one or more particulate filters 110, or any other suitable filter for retaining, burning, or otherwise removing soot from the exhaust gases. The aftertreatment system 100 may also be integrated into the downpipe 108, for instance, disposed downstream of the engine 104 and the particular filters 110 but located upstream of a tail-end of the downpipe 108, or tailpipe 112. Moreover, the aftertreatment system 100 may be configured to remove certain air pollutants, such as nitrogen oxides ($NO_x$) or other particulates or gaseous compounds, from the exhaust gases that may be released by the engine 104. Other suitable configurations and variations of the aftertreatment system 100 and the exhaust system 102 are also possible and will be apparent to those skilled in the art without departing from the scope of the appended claims.

As shown in the particular embodiment of FIG. 1, the aftertreatment system 100 may generally include a selective catalytic reaction (SCR) catalyst 114, a urea injector 116, an ammonia ($NH_3$) sensor 118, a nitrogen oxide ($NO_x$) sensor 120, and an associated control unit 122. For example, the SCR catalyst 114 may generally be disposed downstream of the urea injector 116, and each of the $NH_3$ and $NO_x$ sensors 118, 120 may be disposed downstream of the SCR catalyst 114 and proximate to the final exit path of the downpipe 108 or the tailpipe 112. Moreover, the SCR catalyst 114 may be configured to operate in conjunction with the urea injector 116 so as to remove or reduce $NO_x$ content from the exhaust gases prior to releasing the exhaust gases into the atmosphere. For example, the urea injector 116 may be configured to selectively inject a urea reagent (($NH_2)_2CO$), a water/urea solution, or the like, into the exhaust gas stream of the engine 104 to be absorbed onto a downstream substrate within the SCR catalyst 114. The SCR catalyst 114 may thereby decompose the injected urea solution into $NH_3$, to cause a reaction with $NO_x$ to form water ($H_2O$) and diatomic nitrogen ($N_2$).

The control unit 122 of FIG. 1 may be in electrical communication with each of the urea injector 116, the $NH_3$ sensor 118 and the $NO_x$ sensor 120, and configured to monitor and/or manage overall operation of at least the aftertreatment system 100. In addition, the control unit 122 may also be in electrical communication with the engine ECM 106 and configured to transmit and/or receive information, data or electrical signals indicative of a condition, a state, an instruction, or the like, that is relevant to the operation of the aftertreatment system 100 and/or the engine 104. Similar to the engine ECM 106, the control unit 122 may also be implemented using any one or more of a processor, a microprocessor, a controller, a microcontroller, a DSP, an FPGA, or any other electronic device capable of monitoring, operating and/or managing certain functions of the aftertreatment device 100 according to preprogrammed algorithms stored within a memory accessible thereto. In other embodiments, the control unit 122 may be incorporated within the engine ECM 106, for instance, as a subcomponent or submodule thereof.

Figure 2:
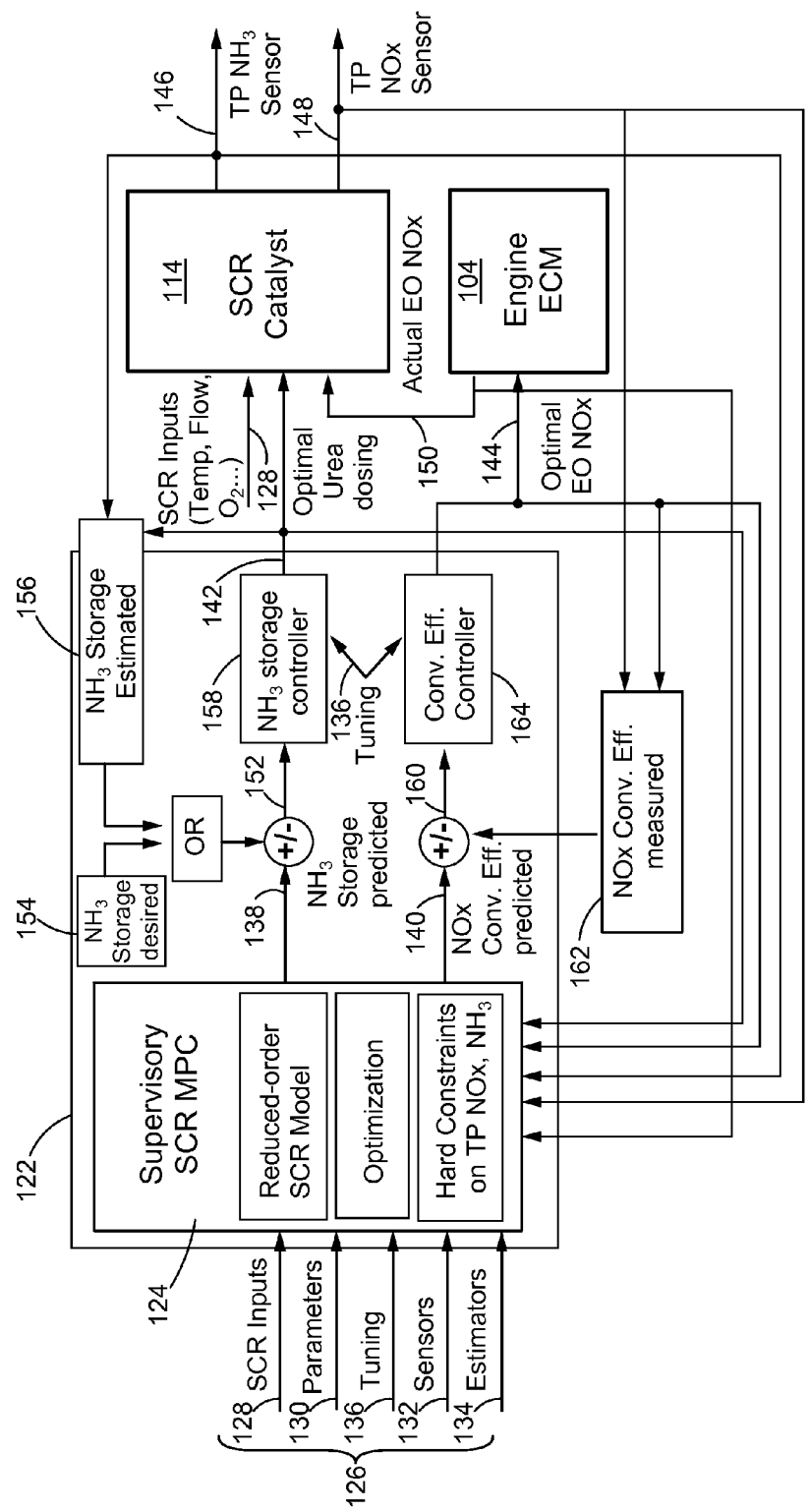
FIG. 2 is a diagrammatic view of one exemplary supervisory model predictive selective catalytic reduction control scheme for an aftertreatment system.

Turning now to FIG. 2, one exemplary implementation of the control unit 122 of an aftertreatment system 100 is diagrammatically illustrated. As shown, operation of the aftertreatment system 100 may generally involve various communications between the control unit 122 and each of the engine ECM 106, the SCR catalyst 114 or the urea injector 116 thereof, the $NH_3$ sensor 118, the $NO_x$ sensor 120, and any other relevant sensors or devices associated with the exhaust system 102 and the engine 104. Furthermore, the control unit 122 of FIG. 2 may essentially be implemented using model predictive control schemes, for example, the supervisory model predictive control (SMPC) scheme 124 shown. More particularly, the SMPC 124 may be implemented using a multiple-input and multiple-output (MIMO) controller. The inputs to the SMPC 124 may include a plurality of system values 126, for example, SCR input values 128, aftertreatment system parameters 130, sensor values 132, estimated values 134, tuning values 136, and the like. The outputs of the SMPC 124 may include, for example, a predicted $NH_3$ storage value 138 and a predicted $NO_x$ conversion efficiency value 140, which may ultimately aid the control unit 122 in determining, for example, an optimal urea dosing target value 142 and an optimal engine $NO_x$ output target value 144.

Among other things, the SCR input values 128 to the SMPC 124 of FIG. 2 may include information corresponding to exhaust gas temperature, exhaust gas flow, $O_2$ content, and the like. The aftertreatment system parameters 130 may include information corresponding to the size of the aftertreatment system 100, the weight of the aftertreatment system 100, the materials and/or components used in the aftertreatment system 100, the geometry or configuration of the aftertreatment system 100, and the like. The sensor values 132 may include sensor data obtained by one or more of the sensors 118, 120 adapted to measure the content of $NH_3$ and $NO_x$ in the exhaust gases flowing through the tailpipe 112. Among other system values 126, the SMPC 124 may also rely on various feedback including, for example, optimal urea dosing target values 142, optimal engine $NO_x$ output target values 144, measured $NH_3$ values 146 as obtained from the $NH_3$ sensor 118 at the tailpipe 112, measured $NO_x$ values 148 as obtained from the $NO_x$ sensor 120 at the tailpipe 112, actual engine $NO_x$ output values 150 as provided by the engine ECM 106, and the like.

The SMPC 124 of FIG. 2 may employ a reduced-order SCR model, or a nonlinear dynamic model with fewer state variables that can be better optimized according to predefined constraints. Moreover, the SMPC 124 may be optimized according to preset $NH_3$ and $NO_x$ limits or constraints as detected by the respective $NH_3$ and $NO_x$ sensors 118, 120 at the tailpipe 112. As shown in FIG. 2, for example, based on the $NH_3$ and $NO_x$ limits or constraints as well as the system values 126 provided, the SMPC 124 may be configured to at least preliminarily determine the predicted $NH_3$ storage value 138 and the predicted $NO_x$ conversion efficiency value 140. The predicted $NH_3$ storage value 138 may correspond to the amount of ammonia that is predicted to be stored in the SCR catalyst 114 under the current operating conditions, or under the current set of system values 126 observed by the SMPC 124. The predicted $NO_x$ conversion efficiency value 140 may correspond to the effectiveness of the urea injections to react with $NO_x$ and to convert $NO_x$ into water ($H_2O$) and diatomic nitrogen ($N_2$) under the current operating conditions. Each of the predicted $NH_3$ storage and $NO_x$ conversion efficiency values 138, 140 may be derived from predefined relationships, for example, via mapped values that have been preprogrammed into the SMPC 124.

As shown in FIG. 2, the control unit 122 may be configured to determine the optimal urea dosing and engine $NO_x$ output target values 142, 144 based on the predicted $NH_3$ storage and $NO_x$ conversion efficiency values 138, 140 determined by the SMPC 124. The optimal urea dosing target value 142 may correspond to the ideal amount of urea that should be introduced into the SCR catalyst 114 for maximum $NO_x$ conversion and minimum ammonia slip. For example, an ideal amount of urea may be sufficient to react with all of the $NO_x$ content that is released from the engine 104 to form harmless water and diatomic nitrogen, but also not in excess so as to release significant amounts of unused ammonia into the atmosphere. The optimal engine $NO_x$ output target value 144 may correspond to the ideal amount of $NO_x$ that is expected to be released by the engine 104 when operating efficiently under the current operating conditions. Moreover, as the fuel efficiency of the engine 104 is directly related to the engine $NO_x$ output, the optimal engine $NO_x$ output target value 144 may serve as one of various engine output characteristics the ECM 106 may use as a setpoint or a reference in improving the fuel efficiency of the engine 104.

In determining the optimal urea dosing target value 142, for example, the control unit 122 of FIG. 2 may determine a differential 152 between the predicted $NH_3$ storage value 138 and one of a target $NH_3$ storage value 154 and an estimated $NH_3$ storage value 156. The target $NH_3$ storage value 154 may correspond to the ideal amount of ammonia that is absorbed by the SCR catalyst 114. The target $NH_3$ storage value 154 may be retrieved from one or more predetermined values that have been programmed onto a memory of the control unit 122. The estimated $NH_3$ storage value 156 may be derived, for example, based on a previous measured $NH_3$ value 146 obtained from the $NH_3$ sensor 118 and a previous optimal urea dosing target value 142. Furthermore, based on the differential 152 and one or more tuning values 136, a $NH_3$ storage controller 158 of the control unit 122 may determine optimal urea dosing target values 142 for a particular iteration to be transmitted to the SCR catalyst 114 for further processing. The control unit 122 may also determine a differential 160 between the predicted $NO_x$ conversion efficiency value 140 and a measured $NO_x$ conversion efficiency value 162. The measured $NO_x$ conversion efficiency value 162 may be derived based at least partially on a previous optimal engine $NO_x$ output target value 144 and a measured $NO_x$ value 148 obtained from the $NO_x$ sensor 120. Additionally, based on the differential 160 and one or more tuning values 136, a conversion efficiency controller 164 of the control unit 122 may determine optimal engine $NO_x$ output target values 144 for a particular iteration to be transmitted to the engine ECM 106 for further processing.

Once the optimal urea dosing target value 142 for a particular iteration has been determined by the control unit 122 of FIG. 2, the SCR catalyst 114 may additionally observe certain SCR input values 128 as well as the actual engine $NO_x$ output value 150 as provided by the engine ECM 106 in order to selectively control the injection of urea therein. Additionally, once the optimal engine $NO_x$ output target value 144 for a particular iteration has been determined by the control unit 122, the engine ECM 106 may be able to adjust certain control parameters of the engine 104 so as to improve fuel efficiency. Furthermore, the control and/or observed values determined for the instant iteration may be at least temporarily stored in a memory accessible to the control unit 122 to be looped or fed back into control processes for a subsequent iteration.

Figure 3:
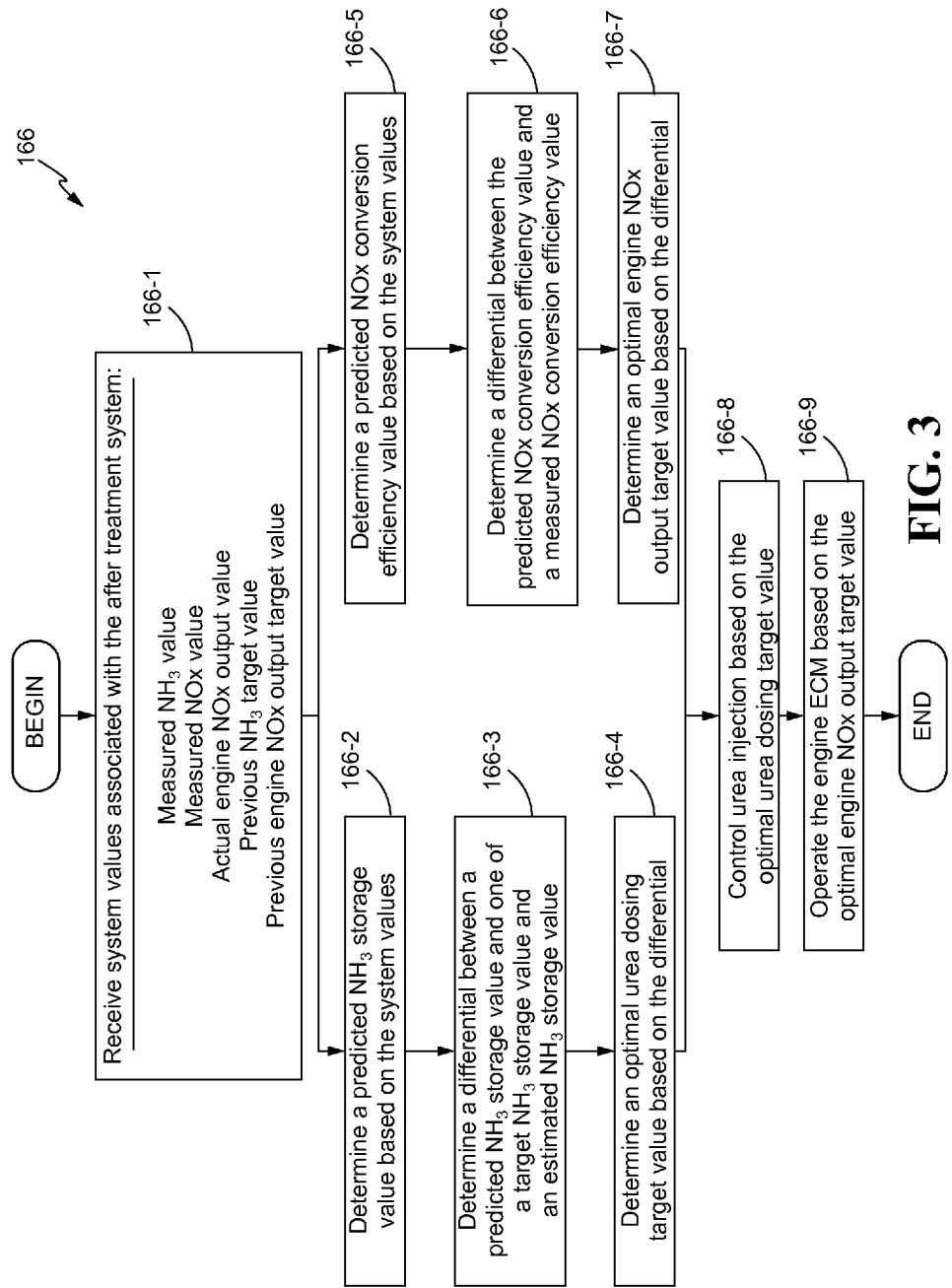
FIG. 3 is a flow diagram of one exemplary algorithm or method of controlling an aftertreatment system having a selective catalytic reduction catalyst.

Turning now to FIG. 3, one exemplary method 166 is provided by which the control unit 122 of the aftertreatment system 100 may be configured to operate and/or manage operation of one or more functions of the aftertreatment system 100. Specifically, the method 166 may be implemented in the form of one or more algorithms, or one or more sets of instructions which may be preprogrammed or incorporated into a memory that is provided within the control unit 122, or otherwise accessible to the control unit 122. Moreover, one or more sets or subsets of instructions or algorithms corresponding to the method 166 may be implemented in modular fashion as graphically demonstrated in the embodiment of FIG. 2, for example, including the SMPC 124, the $NH_3$ storage controller 158, the $NO_x$ conversion efficiency controller 164, and the like. Furthermore, one or more of the instructions or the algorithms corresponding to the method 166 may be implemented as one or more subprocesses of the engine ECM 106. Other alternative configurations, modifications and implementations will be apparent to those skilled in the art without departing from the scope of the appended claims.

As shown, in step 166-1, the control unit 122, in conjunction with the SMPC 124 of FIG. 2 for example, may receive one or more system values 126 associated with the aftertreatment system 100, such as SCR input values 128, aftertreatment system parameters 130, sensor values 132, estimated values 134, tuning values 136, and the like. For example, the method 166 may configure the control unit 122 to retrieve one or more of the measured $NH_3$ value 146, the measured $NO_x$ value 148, the actual engine $NO_x$ output value 150, the previous urea dosing target value 142, the previous engine $NO_x$ output target value 144, and the like. The measured $NH_3$ value 146 may be retrieved from a $NH_3$ sensor 118 that is disposed at the tailpipe 112 of the exhaust system 102, while the measured $NO_x$ value 148 may be retrieved from a $NO_x$ sensor 120 that is disposed at the tailpipe 112. The actual engine $NO_x$ output value 150 may be retrieved from the engine ECM 106. The previous $NH_3$ or urea dosing target value 142 as well as the previous engine $NO_x$ output target value 144 may be retrieved from prior iterations via a feedback loop.

In step 166-2, the control unit 122 may determine a predicted $NH_3$ storage value 138 based on one or more of the system values 126 received in step 166-1. As shown in step 166-3, for example, the control unit 122 may determine a differential 152 between the predicted $NH_3$ storage value and one of a target $NH_3$ storage value 154 and an estimated $NH_3$ storage value 156. As discussed with regards to the SMPC 124 of FIG. 2, the control unit 122 in step 166-4 may then determine an optimal urea dosing target value 142 based on the differential 152 determined in step 166-3. Correspondingly, the control unit 122 in step 166-5 may determine a predicted $NO_x$ conversion efficiency value 140 based on one or more of the system values 126 received in step 166-1. As shown in step 166-6, for example, the control unit 122 may determine a differential 160 between the predicted $NO_x$ conversion efficiency value 140 and the measured $NO_x$ conversion efficiency value 162. The control unit 122 in step 166-7 may additionally determine an optimal engine $NO_x$ output target value based on the differential 160.

Once the optimal urea dosing and engine $NO_x$ output target values 142, 144 are determined, the control unit 122 in step 166-8 may be configured to selectively control the injection of urea into the SCR catalyst 114. In accordance with the SMPC 124 of FIG. 2, for example, the control unit 122 may inject urea according to doses at least partially derived from the optimal urea dosing target value 142 determined in step 166-4, the SCR input values 128 received in step 166-1, and the actual engine $NO_x$ output value 150 received in step 166-1. Moreover, the urea injection may be specifically controlled such that it is sufficient to result in maximum $NO_x$ conversion as well as minimum ammonia slip. In step 166-9, the control unit 122 may further be configured to communicate the optimal engine $NO_x$ output target value 144 to the engine ECM 106. More specifically, the control unit 122 may serve to cause the ECM 106 to adjust control of the engine 104 so as to improve overall fuel efficiency. In such a way, the control unit 122 may further repeat the steps of method 166 of FIG. 3 for subsequent iterations.

INDUSTRIAL APPLICABILITY

In general, the foregoing disclosure finds utility in various applications relating to vehicles, machines or tools employing internal combustion engines having exhaust aftertreatment systems. More specifically, the disclosed systems and methods may be used to provide more efficient control of machine tools, industrial work machines, stationary drive machines, mobile work vehicles, hybrid electric vehicles, or any other related device which may employ an exhaust aftertreatment system in conjunction with a diesel engine, a gasoline engine, a gaseous fuel-powered engine, or the like.

In particular, the disclosed adaptive control systems and methods enable an aftertreatment system to include considerations for the engine $NO_x$ output concentration in determining optimal urea dosing targets. By predicting the optimal the quantity of urea to be injected into the SCR catalyst to react with $NO_x$, the present disclosure is also able to predict variations in the emission levels of $NO_x$ and $NH_3$ at the tailpipe, and is thereby able to implicitly manage the emissions levels of $NO_x$ and $NH_3$ more effectively. Furthermore, the present disclosure determines an optimal level of engine $NO_x$ output concentration to be used as a setpoint for the engine controls, thus enabling the aftertreatment system to not only reduce the emission of pollutants from exhaust gases, but also to improve overall fuel efficiency of the associated internal combustion engine.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of controlling an aftertreatment system having a SCR catalyst and communicating with an engine ECM, comprising the steps of:
   receiving a plurality of system values corresponding to NH3 and NOx emissions of the aftertreatment system, the system values including a measured NH3 value, a measured NOx value, an engine NOx output value, a previous urea dosing target value, and a previous engine NOx output target value;
   determining an optimal urea dosing target value based on the system values and one of a target NH3 storage value and an estimated NH3 storage value;
   determining an optimal engine NOx output target value based on the system values and a measured NOx conversion efficiency value; and
   injecting urea upstream of the SCR catalyst according to the optimal urea dosing target value.

2. The method of claim 1, further comprising the step of transmitting the optimal engine NOx output target value to the engine ECM.

3. The method of claim 1, wherein the measured NH3 value is received from a NH3 sensor disposed downstream of the SCR catalyst, the measured NOx value is received from a NOx sensor disposed downstream of the SCR catalyst, and the engine NOx output value is received from the engine ECM.

4. The method of claim 1, wherein a predicted NH3 storage value is determined based on the system values, and the optimal urea dosing target value is determined based on a differential between the predicted NH3 storage value and one of the target NH3 storage value and the estimated NH3 storage value.

5. The method of claim 1, wherein a predicted NOx conversion efficiency value is determined based on the system values, and the engine NOx output target value is determined based on a differential between the predicted NOx conversion efficiency value and the measured NOx conversion efficiency value.

6. The method of claim 1, wherein the system values correspond to at least SCR input values, aftertreatment system parameters, sensor values, estimated values, and tuning values.

7. The method of claim 6, wherein the SCR input values include one or more of exhaust gas temperature, exhaust gas flow rate, and exhaust gas O2 content, and the aftertreatment system parameters include one or more of aftertreatment system size, aftertreatment system weight, aftertreatment system material specifications, and aftertreatment system geometry.

8. A method of controlling an aftertreatment system having a SCR catalyst and communicating with an engine ECM, comprising the steps of:
   receiving a plurality of system values associated with the aftertreatment system including at least a measured NH3 value, a measured NOx value, an engine NOx output value, a previous urea dosing target value, and a previous engine NOx output target value;
   determining a predicted NH3 storage value based on the system values;
   determining an optimal urea dosing target value based on a differential between the predicted NH3 storage value and one of a target NH3 storage value and an estimated NH3 storage value;
   determining a predicted NOx conversion efficiency value based on the system values;
   determining an optimal engine NOx output target value based on a differential between the predicted NOx conversion efficiency value and a measured NOx conversion efficiency value; and
   injecting urea upstream of the SCR catalyst according to the optimal urea dosing target value.

9. The method of claim 8, further comprising the step of transmitting the optimal engine NOx output target value to the engine ECM.

10. The method of claim 8, wherein the measured NH3 value is received from a NH3 sensor disposed at a tailpipe downstream of the SCR catalyst, the measured NOx value is received from a NOx sensor disposed at the tailpipe, the engine NOx output value is received from the engine ECM, and the previous urea dosing target value and the previous engine NOx output target value are obtained from a feedback loop of the aftertreatment system.

11. The method of claim 8, wherein the system values correspond to at least SCR input values, aftertreatment system parameters, sensor values, estimated values, and tuning values.

12. The method of claim 11, wherein the SCR input values include one or more of exhaust gas temperature, exhaust gas flow rate, and exhaust gas O2 content, and the aftertreatment system parameters include one or more of aftertreatment system size, aftertreatment system weight, aftertreatment system material specifications, and aftertreatment system geometry.

13. An aftertreatment system for an engine having an associated engine ECM, the aftertreatment system comprising:
   a SCR catalyst disposed downstream of the engine;
   at least one NH3 sensor and at least one NOx sensor disposed downstream of the SCR catalyst; and
   a control unit in electrical communication with each of at least the NH3 sensor, the NOx sensor, and the engine ECM, the control unit being configured to receive a plurality of system values corresponding to NH3 and NOx emissions of the aftertreatment system including a measured NH3 value, a measured NOx value, an engine NOx output value, a previous urea dosing target value, and a previous engine NOx output target value, determine an optimal urea dosing target value based on the system values and one of a target NH3 storage value and an estimated NH3 storage value, determine an optimal engine NOx output target value based on the system values and a measured NOx conversion efficiency value, and inject urea upstream of the SCR catalyst according to the optimal urea dosing target value.

14. The aftertreatment system of claim 13, wherein the control unit is further configured to transmit the optimal engine NOx output target value to the engine ECM.

15. The aftertreatment system of claim 13, wherein the measured NH3 value is received from the NH3 sensor, the measured NOx value is received from the NOx sensor, and the engine NOx output value is received from the engine ECM.

16. The aftertreatment system of claim 13, wherein the control unit is configured to determine a predicted NH3 storage value based on the system values, and determine the optimal urea dosing target value based on a differential between the predicted NH3 storage value and one of the target NH3 storage value and the estimated NH3 storage value.

17. The aftertreatment system of claim 13, wherein the control unit is configured to determine a predicted NOx conversion efficiency value based on the system values, and determine the optimal engine NOx output target value based on a differential between the predicted NOx conversion efficiency value and the measured NOx conversion efficiency value.

18. The aftertreatment system of claim 13, wherein the control unit is implemented using a reduced-order SCR model configured to optimize both urea dosing and engine NOx output.

19. The aftertreatment system of claim 13, wherein the control unit includes a supervisory model predictive controller with multiple inputs and multiple outputs, the inputs including SCR input values, aftertreatment system parameters, sensor values, estimated values, and tuning values, and the outputs including the optimal urea dosing target values and the optimal engine NOx output target values.

20. The aftertreatment system of claim 19, wherein the SCR input values include one or more of exhaust gas temperature, exhaust gas flow rate, and exhaust gas O2 content, and the aftertreatment system parameters include one or more of aftertreatment system size, aftertreatment system weight, aftertreatment system material specifications, and aftertreatment system geometry.

\* \* \* \* \*